(12) United States Patent
Zhang et al.

(10) Patent No.: US 9,907,044 B2
(45) Date of Patent: Feb. 27, 2018

(54) IEEE 802.11 ENHANCEMENTS FOR HIGH EFFICIENCY POSITIONING

(71) Applicant: QUALCOMM Incorporated, San Diego, CA (US)

(72) Inventors: Xiaoxin Zhang, Fremont, CA (US); Ning Zhang, Saratoga, CA (US); Carlos Horacio Aldana, Mountain View, CA (US); Youhan Kim, San Jose, CA (US); Praveen Dua, Cupertino, CA (US); Meghna Agrawal, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 14/837,775

(22) Filed: Aug. 27, 2015

(65) Prior Publication Data

US 2016/0081054 A1    Mar. 17, 2016

Related U.S. Application Data

(60) Provisional application No. 62/050,674, filed on Sep. 15, 2014.

(51) Int. Cl.
*H04L 12/26* (2006.01)
*H04W 64/00* (2009.01)
(Continued)

(52) U.S. Cl.
CPC ........... *H04W 64/00* (2013.01); *H04L 5/0055* (2013.01); *H04L 47/283* (2013.01);
(Continued)

(58) Field of Classification Search
None
See application file for complete search history.

(56) References Cited

U.S. PATENT DOCUMENTS

2008/0291883 A1* 11/2008 Seok ............... H04W 64/00
370/338
2010/0128617 A1   5/2010 Aggarwal et al.
(Continued)

FOREIGN PATENT DOCUMENTS

WO    WO-2014160313 A2    10/2014

OTHER PUBLICATIONS

International Search Report and Written Opinion—PCT/US2015/047561—ISA/EPO—Oct. 26, 2015.

*Primary Examiner* — Chi H Pham
*Assistant Examiner* — Fahmida Chowdhury
(74) *Attorney, Agent, or Firm* — Paradice and Li LLP

(57) ABSTRACT

A ranging operation between a first wireless device and a second wireless may be performed by: sending, to the second wireless device, a data frame including a request for the second wireless device to report its actual SIFS duration to the first wireless device; determining a time of departure (TOD) of the data frame; receiving, from the second wireless device, a response frame including SIFS information indicative of the actual SIFS duration of the second wireless device; determining a time of arrival (TOA) of the response frame; and determining a round trip time (RTT) of the data frame and the response frame using the TOD of the data frame, the TOA of the response frame, and the actual SIFS duration of the second wireless device.

30 Claims, 9 Drawing Sheets

(51) Int. Cl.
    *H04L 12/841*    (2013.01)
    *H04W 52/02*    (2009.01)
    *H04L 5/00*    (2006.01)
    *H04W 84/12*    (2009.01)
(52) U.S. Cl.
    CPC ........ *H04W 52/0209* (2013.01); *H04W 84/12* (2013.01); *Y02B 60/50* (2013.01)

(56) References Cited

U.S. PATENT DOCUMENTS

| | | | |
|---|---|---|---|
| 2012/0170565 A1* | 7/2012 | Seok | H04L 27/2602 370/338 |
| 2012/0287797 A1* | 11/2012 | Basson | H04W 16/28 370/252 |
| 2013/0121173 A1* | 5/2013 | Chen | H04W 24/08 370/252 |
| 2014/0213193 A1* | 7/2014 | Zhang | G01S 11/02 455/67.11 |
| 2015/0098460 A1* | 4/2015 | Wang | H04W 4/08 370/338 |
| 2015/0168536 A1* | 6/2015 | Banin | G01S 5/0205 455/456.2 |

* cited by examiner

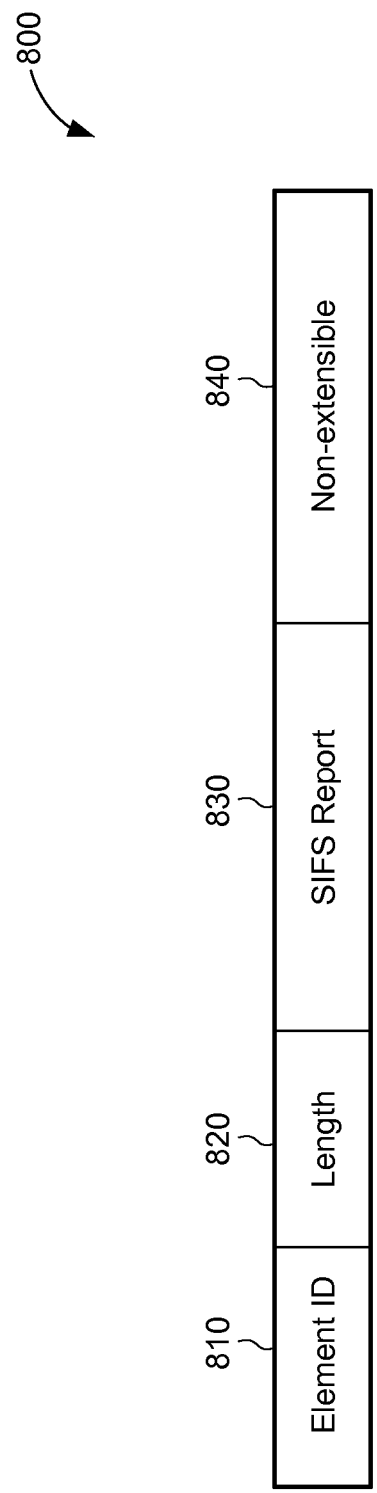

IEEE 802.11 ENHANCEMENTS FOR HIGH EFFICIENCY POSITIONING

CROSS-REFERENCE TO RELATED APPLICATIONS

This application claims priority under 35 USC 119(e) to commonly owned U.S. Provisional Patent Application No. 62/050,674 entitled "IEEE 802.11 ENHANCEMENTS FOR HIGH EFFICIENCY POSITIONING" filed on Sep. 15, 2014, the entirety of which is incorporated by reference herein.

TECHNICAL FIELD

The example embodiments relate generally to wireless networks, and specifically to ranging operations performed between Wi-Fi enabled devices.

BACKGROUND OF RELATED ART

The recent proliferation of Wi-Fi access points in wireless local area networks (WLANs) has made it possible for navigation systems to use these access points for position determination, especially in areas where there are a large concentration of active Wi-Fi access points (e.g., urban cores, shopping centers, office buildings, and so on). For example, a client device or station (STA) such as a cell phone or tablet computer may use the round trip time (RTT) of signals transmitted to and from the access points (APs) to determine the distances between the STA and the APs. Once the distances between the STA and three or more APs are determined, the location of the STA may be estimated using trilateration techniques.

More generally, the distance between a pair of devices may be determined using the RTT of signals exchanged between the devices during ranging operations. Because ranging operations are becoming more and more important (e.g., for indoor positioning), it is desirable to increase the accuracy of ranging operations using minimal capacity of the wireless medium.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Methods and apparatuses are disclosed that may allow a first wireless device to determine an RTT value between itself and a second wireless device using an exchange of only 2 frames without estimating the SIFS duration of the second wireless device. More specifically, in accordance with the example embodiments, the first wireless device may initiate a ranging operation with the second wireless device by sending a data frame to the second wireless device. The data frame causes the second wireless device to report its actual SIFS duration to the first wireless device in a response frame. The first wireless device may receive the response frame, which includes information indicative of the actual SIFS duration of the second wireless device. The first wireless device may then determine the RTT value of the data frame and the response frame using the TOD of the data frame, the TOA of the response frame, and the actual SIFS duration of the second wireless device. In this manner, the example ranging operations disclosed herein may be performed without estimating the SIFS duration of the second wireless device, thereby eliminating ranging errors resulting from uncertainties in the SIFS duration of the second wireless device.

Further, because the example ranging operations disclosed herein use only 2 exchanged frames to determine RTT values, traffic on the wireless medium may be reduced. In addition, because the second wireless device sends only one frame to the first wireless device during the ranging operation, power consumption of the second wireless device may be reduced (e.g., as compared with ranging operations that require greater numbers of exchanged frames). Reducing the power consumption of the second wireless device during ranging operations may be important, for example, when the second wireless device is a mobile device having a limited power supply (e.g., a battery).

For at least some example embodiments, a ranging operation between the first wireless device and the second wireless may be performed by: sending, to the second wireless device, a data frame including a request for the second wireless device to report its actual Short Interframe Space (SIFS) duration to the first wireless device; determining a time of departure (TOD) of the data frame; receiving, from the second wireless device, a response frame including SIFS information indicative of the actual SIFS duration of the second wireless device; determining a time of arrival (TOA) of the response frame; and determining a round trip time (RTT) of the data frame and the response frame using the TOD of the data frame, the TOA of the response frame, and the actual SIFS duration of the second wireless device. The data frame may be a fine timing measurement (FTM) frame. The response frame may be an acknowledgement (ACK) frame or a block acknowledgement (BA) frame including a field or an information element (IE) to store the SIFS information.

For some implementations, the SIFS information may include a difference value indicative of a time difference between the actual SIFS duration and a standard SIFS duration, for example, as defined by the IEEE 802.11 family of standards. For other implementations, the SIFS information may include the difference value and a median SIFS duration of the second wireless device.

In addition, for at least some embodiments, the first wireless device uses a single transmit chain to send the data frame to the second wireless device, and the data frame may include a request for the second wireless device to use a single transmit chain to transmit the response frame to the first wireless device. In this manner, errors resulting from cyclic shift diversity (CSD) may be avoided.

For at least one embodiment, the data frame may include a request for the second wireless device to transmit the response frame using a high throughput/very high throughput (HT/VHT) protocol.

BRIEF DESCRIPTION OF THE DRAWINGS

The example embodiments are illustrated by way of example and are not intended to be limited by the figures of the accompanying drawings. Like numbers reference like elements throughout the drawings and specification.

FIG. 8 depicts an example information element for reporting Short Interframe Space (SIFS) information in response frames in accordance with some embodiments.

DETAILED DESCRIPTION

Figure 1A:
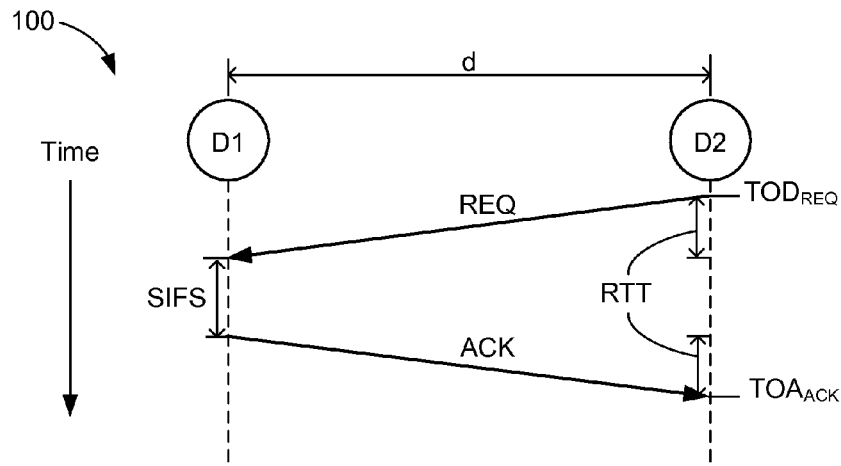
FIG. 1A is a sequence diagram depicting an example ranging operation.

The example embodiments are described below in the context of WLAN systems for simplicity only. It is to be understood that the example embodiments are equally applicable to other wireless networks (e.g., cellular networks, pico networks, femto networks, satellite networks), as well as for systems using signals of one or more wired standards or protocols (e.g., Ethernet and/or HomePlug/PLC standards), and for performing ranging operations between various devices (e.g., between a STA and a wireless AP, between APs, and so on). As used herein, the terms "WLAN" and "Wi-Fi®" may include communications governed by the IEEE 802.11 family of standards, Bluetooth, HiperLAN (a set of wireless standards, comparable to the IEEE 802.11 standards, used primarily in Europe), and other technologies having relatively short radio propagation range. Thus, the terms "WLAN" and "Wi-Fi" may be used interchangeably herein. In addition, although described below in terms of an infrastructure WLAN system including one or more APs and a number of STAs, the example embodiments are equally applicable to other WLAN systems including, for example, multiple WLANs, Independent Basic Service Set (IBSS) networks, ad-hoc networks, peer-to-peer (P2P) networks (e.g., operating according to the Wi-Fi Direct protocols), and/or Hotspots.

In addition, although described herein in terms of exchanging frames between wireless devices, the example embodiments may be applied to the exchange of any data unit, packet, and/or frame between wireless devices. Thus, the term "frame" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scopes all embodiments defined by the appended claims.

Some portions of this disclosure which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In this disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout this disclosure, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that may be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other suitable configuration.

As mentioned above, the distance between a pair of wireless devices may be determined using the RTT of signals or frames exchanged between the wireless devices (e.g., during a ranging operation). For example, referring to the example ranging operation 100 of FIG. 1A, the distance (d) between a first wireless device (D1) and a second wireless device (D2) may be estimated as d=c*RTT/2, where c is the speed of light, and RTT is the summation of the actual signal propagation times of a request (REQ) frame and an acknowledgement (ACK) frame exchanged between the first device D1 and the second device D2. More specifically, device D2 may estimate the value of RTT using the time of departure (TOD) of the REQ frame transmitted from device D2, the time of arrival (TOA) of the ACK frame received by device D2, and the SIFS duration of device D1.

The SIFS duration, which stands for the Short Interframe Space duration, corresponds to the duration of time between device D1 receiving the REQ frame and device D1 transmitting the ACK frame. The SIFS duration, which allows wireless devices time to switch their transceivers from a receive mode (e.g., to receive the REQ frame) to a transmit mode (e.g., to transmit the ACK frame), may be defined as the time required for the wireless device to process a received frame (e.g., a REQ frame) and to initiate transmission of a response frame (e.g., an ACK frame).

Because different make-and-models (and sometimes even same make-and-models) of wireless devices may have different processing delays, the precise value of SIFS may vary between devices (and even between successive frame receptions/transmissions in the same device). As a result, the value of SIFS is typically estimated, which often leads to errors in estimating the distance between two devices. More specifically, the IEEE 802.11 standards currently define the SIFS duration as 10 microseconds (us)+/−900 nano-seconds (ns) for signals transmitted in the 2.4 GHz frequency band, 16 us+/−900 ns for signals transmitted in the 5 GHz frequency band, and 3 us+/−900 ns for signals transmitted in the 60 GHz frequency band. The tolerances in these "standard" SIFS durations may decrease the accuracy of RTT estimates. For example, even if the SIFS duration of device D1 may be estimated within +/−25 ns, a ranging error of +/−7.5 meters may result (which may be unacceptable for many positioning systems).

To reduce ranging errors resulting from uncertainties in SIFS durations, recent revisions to the IEEE 802.11 standards call for each ranging device to capture timestamps of incoming and outgoing frames so that the value of RTT may be determined without using SIFS durations. For example, FIG. 1B shows an example ranging operation 110 depicting a ranging operation between device D1 and device D2 performed using Fine Timing Measurement (FTM) frames in accordance with the IEEE 802.11REVmc standards. For the example of FIG. 1B, device D2 requests the ranging operation, and may therefore be designated as the initiator device; device D1 responds to the requested ranging operation, and may therefore be designated as the responder device. As depicted in FIG. 1B, device D2 sends a Fine Timing Measurement Request (FTM_REQ) frame to device D1, which responds with an ACK frame. The exchange of the FTM_REQ frame and the ACK frame is a handshake process 111 that not only signals an intent to perform a ranging operation but also allows each of devices D1 and D2 to determine whether the other of devices D1 and D2 supports capturing timestamps.

Assuming that both device D1 and device D2 support capturing timestamps, device D1 initiates a ranging operation 112 by sending a first FTM frame (FTM_1) to device D2, and captures the TOD of FTM_1 at time $t_1$. Device D2 receives the FTM_1 and captures the TOA of FTM_1 at time $t_2$. Device D2 responds with an ACK frame, and captures the TOD of the ACK frame at time $t_3$. Device D1 receives the ACK frame and captures the TOA of the ACK frame at time $t_4$. At time $t_5$, device D1 sends to device D2 a second FTM frame (FTM_2) that includes the timestamps captured at times $t_1$ and $t_4$. Device D2 receives the FTM_2 frame at time $t_6$, and may capture its timestamp. Device D2 sends an ACK frame to device D1 at time $t_7$. Device D1 receives the ACK frame at time $t_8$.

Upon receiving FTM_2 at time $t_6$, device D2 has timestamp values for times $t_1$, $t_2$, $t_3$, and $t_4$ that correspond to the TOD of FTM_1 from device D1, the TOA of FTM_1 at device D2, the TOD of the ACK frame from device D2, and the TOA of the ACK frame at device D1, respectively. Thereafter, device D2 may determine RTT as $(t_4-t_3)+(t_2-t_1)$. Because determining the RTT value does not involve estimating the SIFS duration for either device D1 or device D2, the determined RTT value does not involve errors resulting from uncertainties in SIFS durations.

Figure 1B:
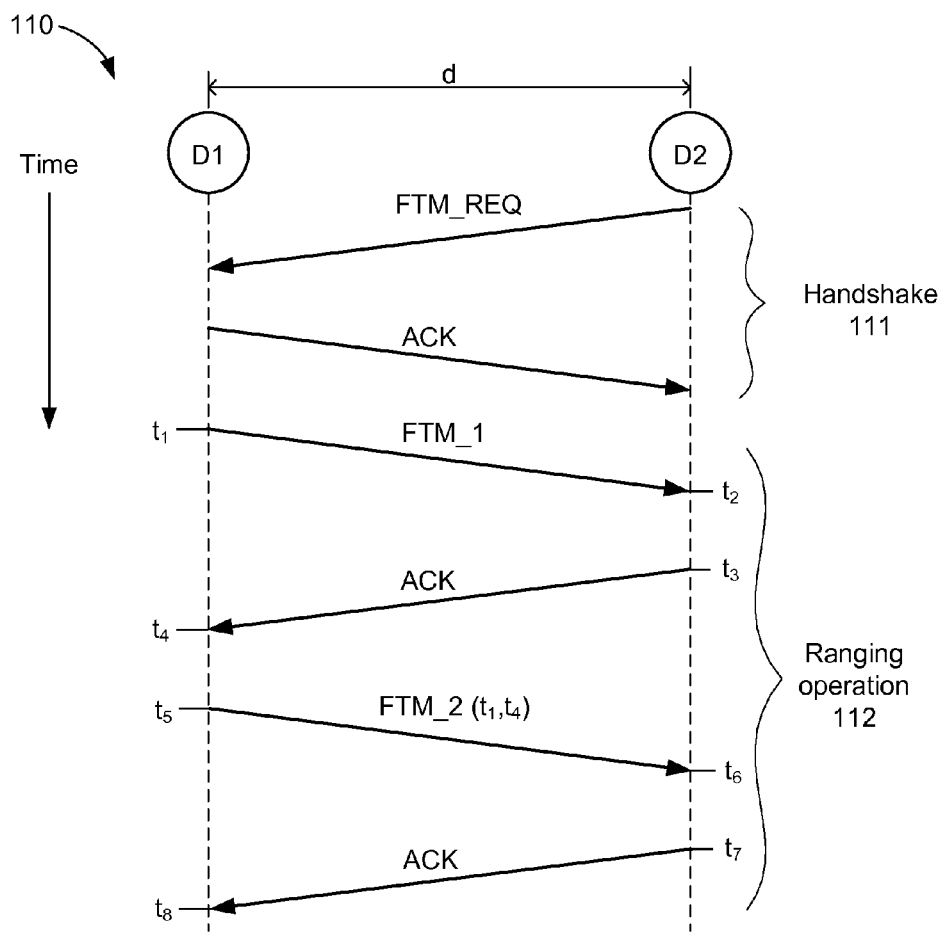
FIG. 1B is a sequence diagram depicting another example ranging operation.

Although more accurate than the example ranging operation 100 of FIG. 1A, the example ranging operation 110 of FIG. 1B involves an exchange of 6 frames (e.g., compared to an exchange of only 2 frames in the example ranging operation 100 depicted in FIG. 1A) to obtain a single RTT measurement, which undesirably impacts throughput and increases latency. In addition, although device D2 requested the ranging operation 110, device D1 transmits the FTM frames, captures timestamps, and transmits the captured timestamps to device D2, all of which consume power and resources. For environments in which device D1 is a mobile station powered by a battery, this consumption of power may reduce the battery life of device D1 (even though device D1 did not request the ranging operation).

Thus, in accordance with the example embodiments, methods and apparatuses for performing a ranging operation are disclosed that may determine an RTT value between an initiator device and a responder device using an exchange of only 2 frames without estimating the SIFS duration of the responder device. More specifically, ranging operations disclosed herein may increase the accuracy of RTT measurements between wireless devices (e.g., as compared with the example ranging operation 100 of FIG. 1A) by requesting, in a data frame sent to the responder device, the responder device to report its actual SIFS duration to the initiator device in a response frame. In this manner, the initiator device does not have to estimate the SIFS duration of the responder device. For example, in some implementations, the initiator device may initiate a ranging operation with the responder device by sending a data frame to the responder device. The data frame causes the responder device to report its actual SIFS duration to the initiator device in a response frame. The initiator device may receive the response frame, which includes information indicative of the actual SIFS duration of the responder device. The initiator device may then determine the RTT value of the data frame and the response frame using the TOD of the data frame from the initiator device, the TOA of the response frame at the initiator device, and the actual SIFS duration of the responder device. In this manner, ranging operations of the example embodiments may be performed using only 2 exchanged frames to determine the RTT value without the initiator device estimating the responder device's SIFS duration, thereby eliminating ranging errors resulting from uncertainties in the SIFS duration of the responder device. In addition, because the responder device sends only one frame to the initiator device during ranging operations of the example embodiments, power consumption of the responder device may be reduced (e.g., as compared with the example ranging operation 110 of FIG. 1B). Reducing the power consumption of the responder device during ranging operations may be important, for example, when the responder device is a mobile device having a limited power supply (e.g., a battery). These are at least some of the technical solutions provided by the example embodiments to the aforementioned technical problems.

Figure 2:
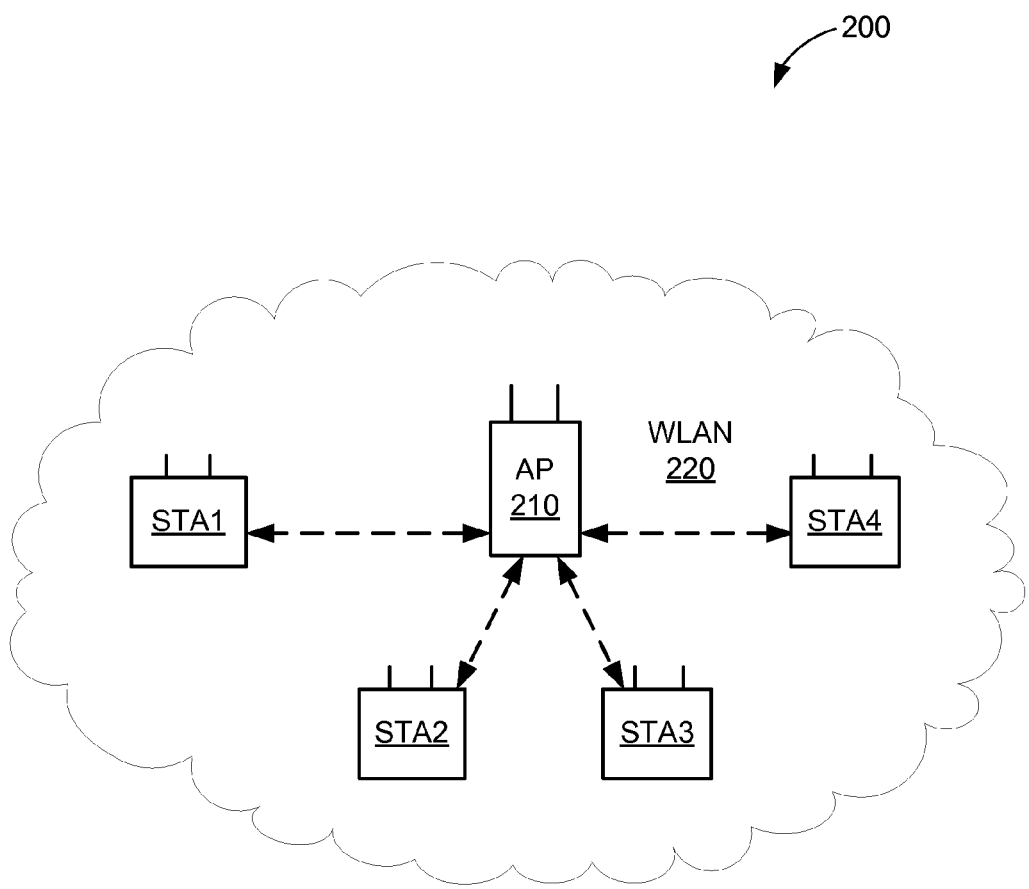
FIG. 2 is a block diagram of a wireless system within which the example embodiments may be implemented.

FIG. 2 is a block diagram of a wireless system 200 within which the example embodiments may be implemented. The wireless system 200 is shown to include four wireless stations STA1-STA4, a wireless access point (AP) 210, and a wireless local area network (WLAN) 220. The WLAN 220 may be formed by a plurality of Wi-Fi access points (APs) that may operate according to the IEEE 802.11 family of standards (or according to other suitable wireless protocols). Thus, although only one AP 210 is shown in FIG. 2 for simplicity, it is to be understood that WLAN 220 may be formed by any number of access points such as AP 210. The AP 210 is assigned a unique media access control (MAC) address that is programmed therein by, for example, the manufacturer of the access point. Similarly, each of STA1-STA4 is also assigned a unique MAC address. For some embodiments, the wireless system 200 may correspond to a multiple-input multiple-output (MIMO) wireless network. Further, although the WLAN 220 is depicted in FIG. 2 as an infrastructure basic service set (BSS) network, for other example embodiments, WLAN 220 may be an independent basic service set (IBSS) network, an ad-hoc network, or a peer-to-peer (P2P) network (e.g., operating according to the Wi-Fi Direct protocols). Similarly, although four stations STA1-STA4 are shown in FIG. 2, WLAN 220 and/or AP 210 may be associated with other numbers of stations.

Each of stations STA1-STA4 may be any suitable Wi-Fi enabled wireless device including, for example, a cell phone, personal digital assistant (PDA), tablet device, laptop computer, or the like. Each of stations STA1-STA4 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, each of stations STA1-STA4 may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 5.

The AP 210 may be any suitable device that allows one or more wireless devices to connect to a network (e.g., a local area network (LAN), wide area network (WAN), metropolitan area network (MAN), and/or the Internet) via AP 210 using Wi-Fi, Bluetooth, or any other suitable wireless communication standards. For at least one embodiment, AP 210 may include one or more transceivers, one or more processing resources (e.g., processors and/or ASICs), one or more memory resources, and a power source. The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 5.

For the stations STA1-STA4 and/or AP 210, the one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 2.4 GHz frequency band, within a 5 GHz frequency band in accordance with the IEEE 802.11 specification, and/or within a 60 GHz frequency band. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within each of the stations STA1-STA4 may be any technically feasible transceiver such as a ZigBee transceiver described by a specification from the ZigBee specification, a WiGig transceiver, and/or a HomePlug transceiver described a specification from the HomePlug Alliance.

Further, the example embodiments described herein, each of the stations STA1-STA4 (and AP 210) may include radio frequency (RF) ranging circuitry (e.g., formed using well-known software modules, hardware components, and/or a suitable combination thereof) that may be used to estimate the distance between itself and one or more other Wi-Fi enabled devices using ranging techniques described herein. In addition, each of the stations STA1-STA4 and/or AP 210 may include a local memory (not shown in FIG. 2 for simplicity) to store a cache of Wi-Fi access point and station data.

For at least some embodiments, ranging operations described herein may be performed without using the AP 210, for example, by having a number of the stations operating in an ad-hoc or peer-to-peer mode, thereby allowing the stations to range one another even when outside the reception range of AP 210 or a visible WLAN (or other wireless network). In addition, for at least some embodiments, ranging operations described herein may be performed between two APs that are in wireless range of each other.

Figure 3:
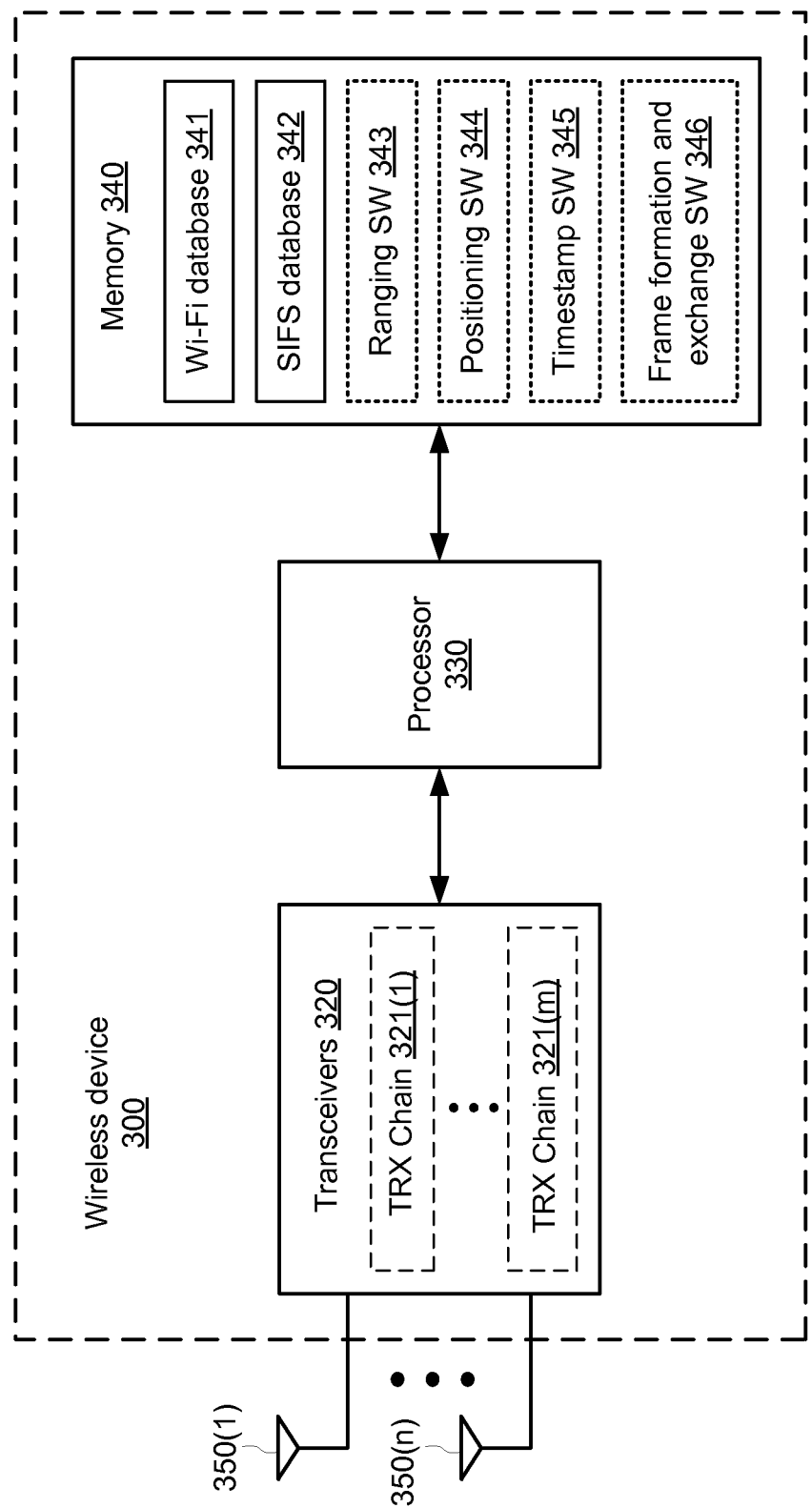
FIG. 3 is a block diagram of a wireless device in accordance with some embodiments.

FIG. 3 shows a wireless device 300 that may be one embodiment of the stations STA1-STA4 and/or AP 210 of FIG. 2. The wireless device 300 may include a number of transceivers 320, a processor 330, a memory 340 and a number of antennas 350(1)-350(n). The transceivers 320 may be coupled to antennas 350(1)-350(n) either directly or through an antenna selection circuit (not shown for simplicity). The transceivers 320 may be used to transmit signals to and receive signals from other wireless devices (e.g., APs and/or STAs), and may be used to scan the surrounding environment to detect and identify nearby access points and/or STAs (e.g., within wireless range of wireless device 300). As depicted in FIG. 3, the transceivers 320 may include any number of transceiver chains 321(1)-321(m), each of which includes a transmit chain to process and transmit signals to other wireless devices via antennas 350(1)-350(n) and includes a receive chain to process signals received from antennas 350(1)-350(n). Thus, for example embodiments, the wireless device 300 may be configured for MIMO operations. The MIMO operations may include single-user MIMO (SU-MIMO) operations and multi-user MIMO (MU-MIMO) operations.

Although not shown in FIG. 3 for simplicity, the wireless device 300 may include one or more baseband processors to process signals received from processor 330 and/or memory 340 and to forward the processed signals to transceivers 320 for transmission via one or more of antennas 350(1)-350(n), and may be used to process signals received from one or more of antennas 350(1)-350(n) via transceivers 320 and to forward the processed signals to processor 330 and/or memory 340.

Although processor 330 is depicted in the example of FIG. 3 as being coupled between transceivers 320 and memory 340, for other embodiments, transceivers 320, processor 330, and/or memory 340 may be connected together using one or more buses (not shown for simplicity).

Memory 340 may include a Wi-Fi database 341 that may store location data, configuration information, data rates, MAC addresses, and other suitable information for a number of wireless devices. The Wi-Fi database 341 may also store profile information for a number of wireless devices. The profile information for a given wireless device may include information including, for example, the wireless device's SSID, channel information, RSSI values, goodput values, channel state information (CSI), and connection history with wireless device 300.

Memory 340 may also include a SIFS database 342 that may store, for example, a number of previously determined SIFS durations for the wireless device 300, one or more median SIFS durations for wireless device 300, and/or whether other wireless devices support ranging operations in accordance with the example embodiments.

Figure 5:
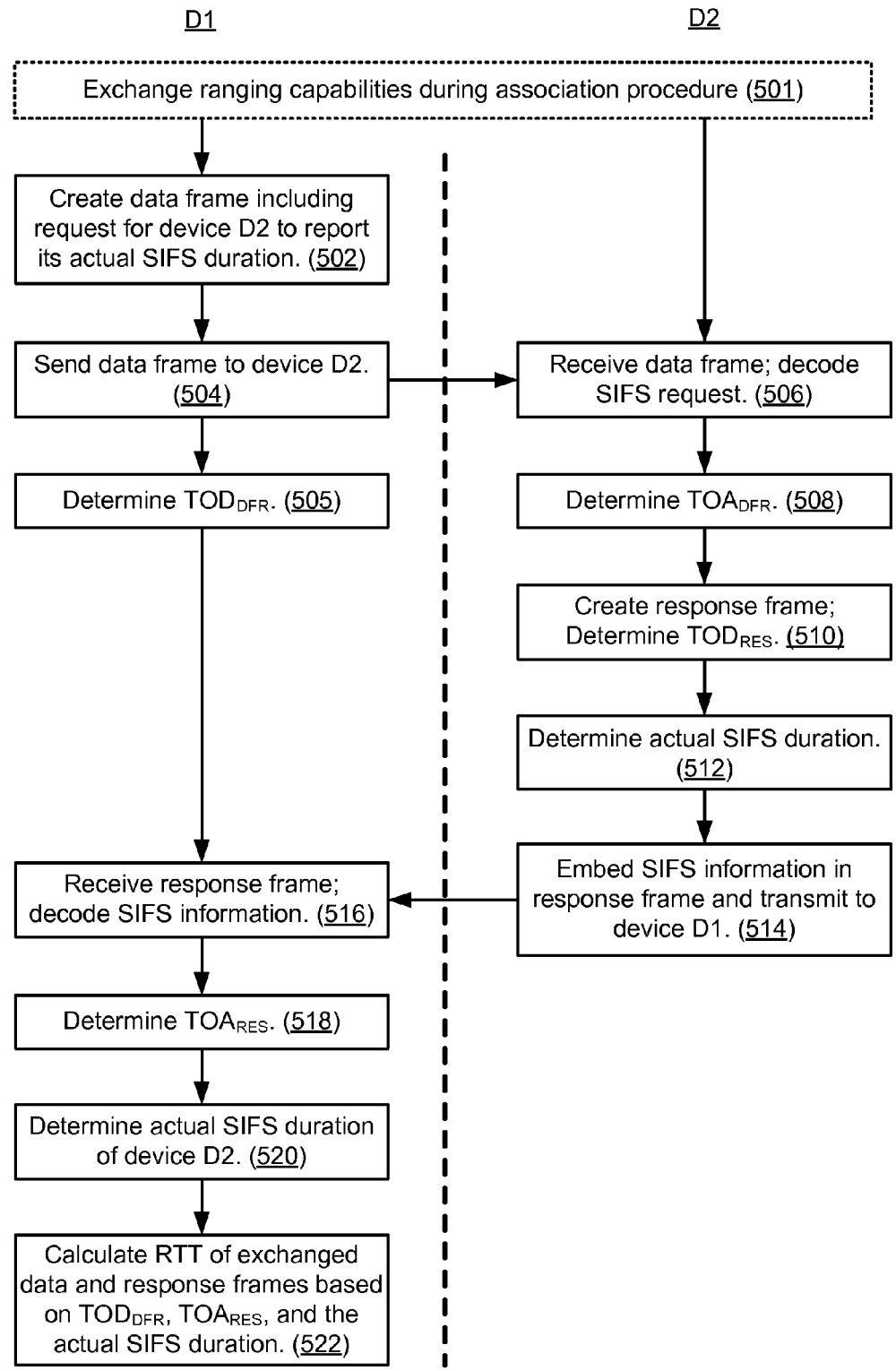
FIG. 5 shows an illustrative flowchart depicting the ranging operation of FIG. 4, in accordance with the example embodiments.

Memory 340 may also include a non-transitory computer-readable medium (e.g., one or more nonvolatile memory elements, such as EPROM, EEPROM, Flash memory, a hard drive, and so on) that may store the following software (SW) modules:
- a ranging SW module 343 to determine RTT values and/or the distance between wireless device 300 and another device (e.g., as described for one or more operations of FIG. 5);
- a positioning SW module 344 to determine the location of wireless device 300 based on the distances determined by the ranging SW module 343 and/or based on the locations of other Wi-Fi enabled devices (e.g., as described for one or more operations of FIG. 5);
- a timestamp SW module 345 to capture timestamps (e.g., frame TOD and/or frame TOA information) and to determine actual SIFS durations associated with frame exchanges of wireless device 300 (e.g., as described for one or more operations of FIG. 5); and
- a frame formation and exchange SW module 346 to create, send, and/or receive data frames and response frames of the example embodiments (as well as other suitable data frames, action frames, and control frames) to and from other wireless devices, to embed SIFS requests into frames transmitted to other wireless devices, and/or to embed information indicative of the actual SIFS duration of wireless device 300 into response frames (e.g., as described for one or more operations of FIG. 5).

Each software module includes instructions that, when executed by processor 330, cause wireless device 300 to perform the corresponding functions. The non-transitory computer-readable medium of memory 340 thus includes instructions for performing all or a portion of the operations of FIG. 5.

Processor 330, which is shown in the example of FIG. 3 as coupled to transceivers 320 and to memory 340, may be any suitable one or more processors capable of executing scripts or instructions of one or more software programs stored in wireless device 300 (e.g., within memory 340). For example, processor 330 may execute ranging SW module 343, positioning SW module 344, timestamp SW module 345, and frame formation and exchange SW module 346. The ranging SW module 343 may be executed by processor 330 to determine the distance between wireless device 300 and another Wi-Fi enabled device using RF ranging operations. The positioning SW module 344 may be executed by processor 330 to determine the location of wireless device 300 using nearby Wi-Fi enabled devices as reference points. The timestamp SW module 345 may be executed by processor 330 to capture timestamps (e.g., frame TOD and/or frame TOA information) and to determine actual SIFS durations associated with frame exchanges of wireless device 300. The frame formation and exchange SW module 346 may be executed by processor 330 to create, send, and/or receive data frames and response frames of the example embodiments (as well as other suitable data frames, action frames, and control frames) to and from other wireless devices, to embed SIFS requests into frames transmitted to other wireless devices, and/or to embed information indicative of the actual SIFS duration of wireless device 300 into response frames.

Figure 4:
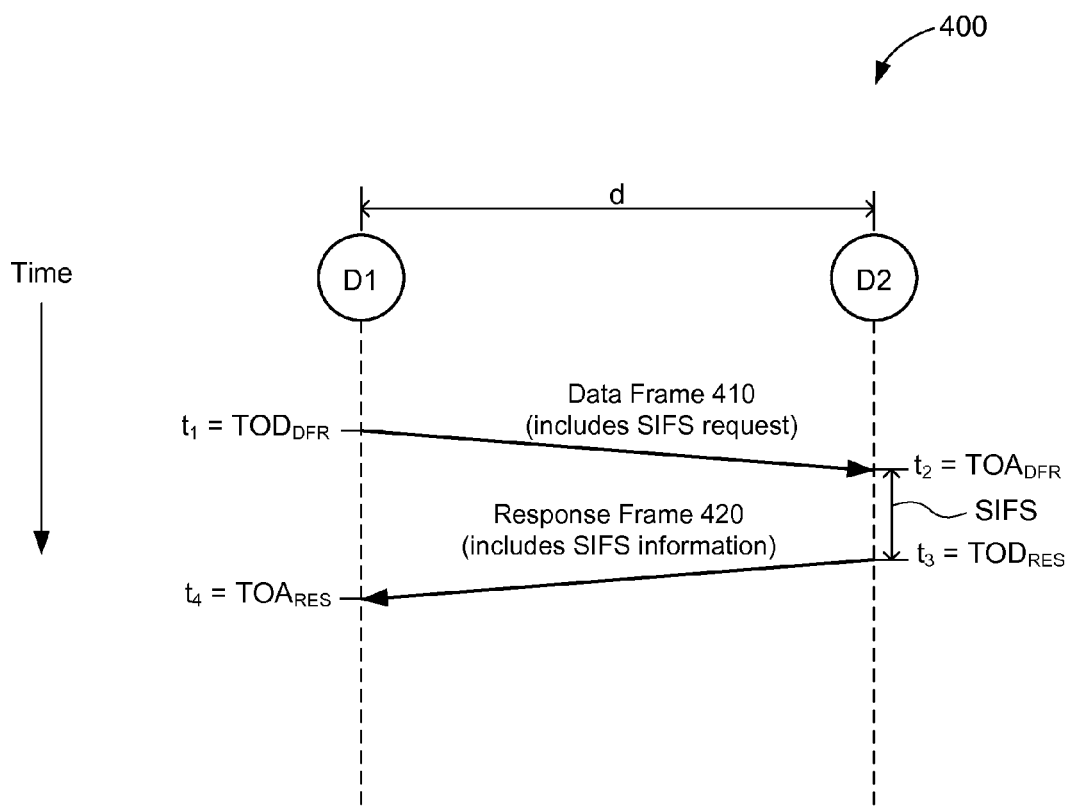
FIG. 4 is a sequence diagram depicting a ranging operation in accordance with some embodiments.

FIG. 4 is a sequence diagram depicting an example ranging operation 400 performed between two wireless devices D1 and D2 in accordance with example embodiments. Devices D1 and D2 may be any suitable Wi-Fi enabled devices including, for example, a mobile device (e.g., a smart phone or tablet computer) or a stationary device (e.g., a wireless access point or other ranging device). For purposes of discussion herein, device D1 is the initiator device, and device D2 is the responder device. For at least some embodiments, devices D1 and D2 may each be one of AP 210 or stations STA1-STA4 of FIG. 2.

Referring also to the illustrative flow chart 500 of FIG. 5, the wireless devices D1 and D2 may, for some embodiments, exchange ranging capabilities during an association procedure (501). The exchange of ranging capabilities may inform each of devices D1 and D2 whether the other of devices D1 and D2 supports capturing timestamps and/or is able to determine its own SIFS duration. For at least one embodiment, the exchange of ranging capabilities may also cause device D2 (the responder device) to respond to one or more selected types of frames sent by device D1 (the initiator device) by embedding its SIFS information in response frames sent to device D1. The selected types of frames sent by device D1 may include, for example, frames or signals that initiate ranging operations with device D2.

The ranging operation 400 depicted in FIG. 4 begins with device D1 creating a data frame 410 that includes a request for device D2 to report its actual SIFS duration to device D1 (502). The request for device D2 to report its actual SIFS duration to device D1 may hereinafter be referred to as the "SIFS request." The data frame 410 may be any suitable data frame that initiates a ranging operation with device D2 (or that at least causes device D2 to respond with a frame including its actual SIFS duration). For some embodiments, the data frame 410 may be an FTM frame. For other embodiments, the data frame 410 may be any suitable action frame, control frame, or management frame that includes the SIFS request and initiates the example ranging operation 400.

The SIFS request may be any suitable bit pattern that, when received and decoded by device D2, causes device D2 to report its actual SIFS duration (or at least information indicative of its actual SIFS duration) to device D1. The SIFS request may be embedded within any suitable field of the data frame 410, or may be appended to the data frame 410. For example, the SIFS request may be embedded within a number of reserved bits of the data frame 410, may be embedded in an information element (IE) provided within or appended to the data frame 410, or may be embedded in a vendor-specific information element (VSIE) provided within or appended to the data frame 410.

As mentioned above, for at least some embodiments, device D2 may agree, during the association procedure, to report its SIFS information to device D1 in response frames sent to device D1. For these embodiments, device D1 may not include an explicit SIFS request in the data frame 410 sent to device D2, for example, because device D2 may automatically report its SIFS information when responding to and/or acknowledging receipt of one or more selected types of frames transmitted from device D1.

Once the data frame 410 is created, device D1 sends the data frame 410 to device D2 at time $t_1$ (504). Device D1 determines the TOD of the data frame 410 (e.g., $TOD_{DFR}=t_1$), for example, by capturing a timestamp at time $t_1$ (505). For some implementations, device D1 may execute the timestamp SW module 345 of FIG. 3 to capture $TOD_{DFR}$, and may store the value of $TOD_{DFR}$ in memory 340.

At time $t_2$, device D2 receives the data frame 410 transmitted from device D1, and decodes the SIFS request (506). Device D2 may determine the TOA of the received data frame 410 (e.g., $TOA_{DFR}=t_2$), for example, by capturing a timestamp at time $t_2$ (508). For some implementations, device D2 may execute the timestamp SW module 345 of FIG. 3 to capture $TOA_{DFR}$, and may store the value of $TOA_{DFR}$ in memory 340.

Device D2 creates a response frame 420 to send back to device D1, and determines the TOD of the response frame 420 (e.g., $TOD_{RES}=t_3$), for example, by capturing a timestamp at time $t_3$ (510). For some implementations, device D2 may execute the timestamp SW module 345 of FIG. 3 to capture $TOD_{RES}$, and may store the value of $TOD_{RES}$ in memory 340. The response frame 420, which may acknowledge receipt of the data frame 410 transmitted from device D1, may include information indicative of device D2's actual SIFS duration, as explained in more detail below.

In response to the decoded SIFS request, device D2 may determine its actual SIFS duration (512). Alternatively, if the data frame 410 did not include a SIFS request and device D2 agreed (e.g., during association) to report its SIFS information in response to receiving one or more selected types of frames from device D1, then device D2 may automatically determine its actual SIFS duration. Device D2 may determine its actual SIFS duration in any suitable manner. For example, the actual SIFS duration of device D2 may be expressed as $SIFS_{actual}=t_3-t_2=TOD_{RES}-TOA_{DFR}$. Thus, for some embodiments, device D2 may determine its actual SIFS duration as the time duration between (1) the time at which an end of a last symbol of the data frame 410 is received from device D1 and (2) the time at which a beginning of a first symbol of the response frame 420 is to be transmitted to device D1. For other embodiments, device D2 may have already determined its actual SIFS duration based on one or more previous frame exchanges with device D1 (or alternatively based on one or more previous frame exchanges with another wireless device). Further, for at least one embodiment, device D2 may determine its actual SIFS duration based on an average value or a median value of a number of previously determined SIFS durations (e.g., for a corresponding number of previous frame exchanges with device D1 and/or another wireless device).

Next, device D2 embeds SIFS information indicative of its actual SIFS duration into the response frame 420, and transmits the response frame 420 to device D1 at time $t_3$ (514). The response frame 420 may be any suitable frame that responds to or acknowledges receipt of the data frame 410 transmitted from device D1. For example, the response frame 420 may be an acknowledgement (ACK) frame or a block acknowledgement (BA) frame. For at least some embodiments, the response frame 420 may be an ACK frame or a BA frame modified in accordance with example embodiments, for example, as described in more detail below with respect to FIGS. 6A-6B and 7A-7B. For other embodiments, the response frame 420 may be any suitable action frame, control frame, or management frame that includes the SIFS information.

The SIFS information may include any information from which device D1 may obtain, derive, or determine the actual SIFS duration of device D2. For example, the SIFS information may be the actual SIFS duration of device D2, may be a difference value indicating a time difference between the actual SIFS duration and a predetermined SIFS duration (e.g., a "standard" SIFS duration defined by the IEEE 802.11 family of standards, and/or may be an average value or a median value of a number of previously determined SIFS durations of device D2. The SIFS information may be expressed as a binary number that corresponds to a predetermined unit of time (e.g., in microseconds).

The SIFS information may be embedded within any suitable field of the response frame 420, or may be appended to the response frame 420. For example, the SIFS information may be embedded within a number of reserved bits of the response frame 420, may be embedded in an IE provided within or appended to the response frame 420, or may be embedded in a VSIE provided within or appended to the response frame 420. For at least some embodiments, the SIFS information may be embedded within a new field associated with the response frame 420, for example, as discussed in more detail below with respect to FIGS. 6A-6B and 7A-7B.

At time $t_4$, device D1 receives the response frame 420 transmitted from device D2, and decodes the SIFS information embedded therein (516). Device D1 may determine the TOA of the response frame 420 (e.g., $TOA_{RES}=t_4$), for example, by capturing a timestamp at time $t_4$ (518). For some implementations, device D1 may execute the timestamp SW module 345 of FIG. 3 to capture $TOA_{RES}$, and may store the value of $TOA_{RES}$ in memory 340.

In response to the decoded SIFS information, device D1 may determine the actual SIFS duration of device D2 (520). The actual SIFS duration may be obtained, derived, or determined from the SIFS information provided in the response frame 420 in any suitable manner, for example, as described in more detail below with respect to FIGS. 6A-6B and 7A-7B.

Thereafter, device D1 may determine the RTT value of the exchanged data frame 410 and response frame 420 based on the TOD of the data frame 410, the TOA of the response frame 420, and the actual SIFS duration of device D2 (522). Using the actual SIFS duration of device D2 to determine the RTT value between devices D1 and D2 may increase accuracy of the ranging operation 400, for example, as compared with ranging operations that use estimated SIFS durations to determine RTT values (e.g., as depicted in the example ranging operation 100 of FIG. 1A). In addition, because device D2 embeds information indicative of its actual SIFS duration in the response frame 420, the ranging operation 400 may provide an accurate RTT value using an exchange of only 2 frames, for example, as compared with the exchange of 8 frames in the example ranging operation 110 of FIG. 1B. In this manner, the example embodiments may allow device D1 to determine more accurate RTT measurements than the example ranging operation 100 of FIG. 1A while using fewer frame exchanges than the example ranging operation 110 of FIG. 1B.

For some embodiments, device D1 and/or device D2 may capture timestamps at their respective media access control layers (MACs). For other embodiments, device D1 and/or device D2 may capture timestamps using firmware. Further, for at least some embodiments, device D1 may capture the timestamp for $TOD_{DFR}$ (at time $t_1$) as the time when an end of the last symbol of the data frame 410 is transmitted from device D1; device D2 may capture the timestamp for $TOA_{DFR}$ (at time $t_2$) as the time when an end of the last symbol of the data frame 410 is received; device D2 may capture the timestamp for $TOD_{RES}$ (at time $t_3$) as the time when a beginning of the first symbol of the response frame 420 is transmitted from device D2; and device D1 may capture the timestamp for $TOA_{RES}$ (at time $t_4$) as the time when a beginning of the first symbol of the response frame 420 is received. Then, device D2 may determine its actual SIFS duration as $SIFS_{actual}=t_3-t_2$, and device D1 may determine the RTT value as $RTT=t_4-t_1-SIFS_{actual}$. In this manner, the RTT value may be determined without regard to the lengths of the data frame 410 and the response frame 420.

For other embodiments, device D1 may capture timestamps for $TOD_{DFR}$ as the time when a beginning of the first symbol of the data frame 410 is transmitted from device D1 and/or may capture timestamps for $TOA_{RES}$ as the time when an end of the last symbol of the response frame 420 is received. Referring also to FIG. 3, for at least one embodiment, device D2 may determine both the TOA of the data frame 410 and the TOD of the response frame 420 at the port of a corresponding one of its antennas 350(1)-350(n).

As mentioned above, device D2 may report its actual SIFS duration to device D1 by embedding information indicative of its actual SIFS duration into response frame 420. More specifically, for some embodiments, the response frame 420 may be an ACK frame that is modified to include a new field dedicated for storing SIFS information of device D2. The modified ACK frame may hereinafter be referred to as an "ACK-RTT frame."

Figure 6A:
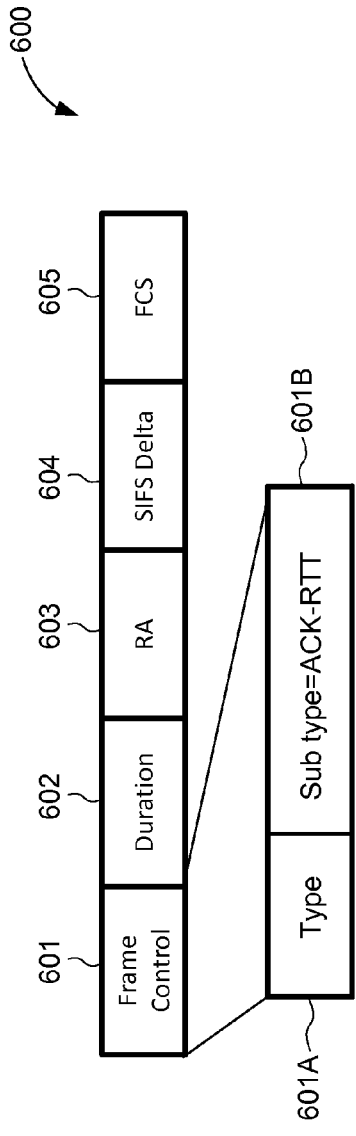
FIG. 6A depicts an example acknowledgement frame in accordance with some embodiments.

For example, FIG. 6A shows an example ACK-RTT frame 600 in accordance with the example embodiments. The ACK-RTT frame 600 may be used as the response frame 420 in the example ranging operation 400 depicted in FIG. 4. The example ACK-RTT frame 600 may include a 2-byte frame control field 601, a 2-byte duration field 602, a 6-byte receiver address (RA) field 603, a 3-byte SIFS delta field 604, and a 4-byte frame control sequence (FCS) field 605. The frame control field 601 may include a 2-bit frame Type field 601A and a 4-bit Sub type field 601B. For other embodiments, the field lengths of the example ACK-RTT frame 600 may be of other suitable values.

In accordance with the example embodiments, the Type field 601A and the Sub type field 601B may each be populated with currently unused or reserved bit patterns to indicate that the corresponding frame is an ACK-RTT frame 600, as depicted in FIG. 6A. For example, while a bit pattern of "1101" for the Sub type field 601B indicates an ACK frame (e.g., as defined by the IEEE 802.11 family of standards), a selected one of the unused or reserved bit patterns for the Sub type field 601B may be used to indicate the frame is an ACK-RTT frame 600.

The SIFS delta field 604 is a new field that is not currently defined by the IEEE 802.11 standards. In accordance with the example embodiments, the SIFS delta field 604 may be used to store a difference value indicating a difference in time between the actual SIFS duration of device D2 and the "standard" SIFS duration. The difference value, which may hereinafter be referred to as the "SIFS delta value," may be expressed as $SIFS_{delta}=SIFS_{actual}-SIFS_{standard}$. Thus, for wireless devices operating in the 2.4 GHz frequency band, $SIFS_{delta}=SIFS_{actual}-10$ us; for wireless devices operating in the 5 GHz frequency band, $SIFS_{delta}=SIFS_{actual}-16$ us; and for wireless device operating in the 60 GHz frequency band, $SIFS_{delta}=SIFS_{actual}-3$ us.

For example embodiments in which the SIFS delta field 604 includes 3 bytes (e.g., 24 bits), the SIFS delta field 604 may store a SIFS delta value of +/−900 ns when the per-bit resolution is 0.1 ns. For other embodiments, the SIFS delta field may include other numbers of bits and/or the per-bit resolution may be of values other than 0.1 ns.

Figure 6B:
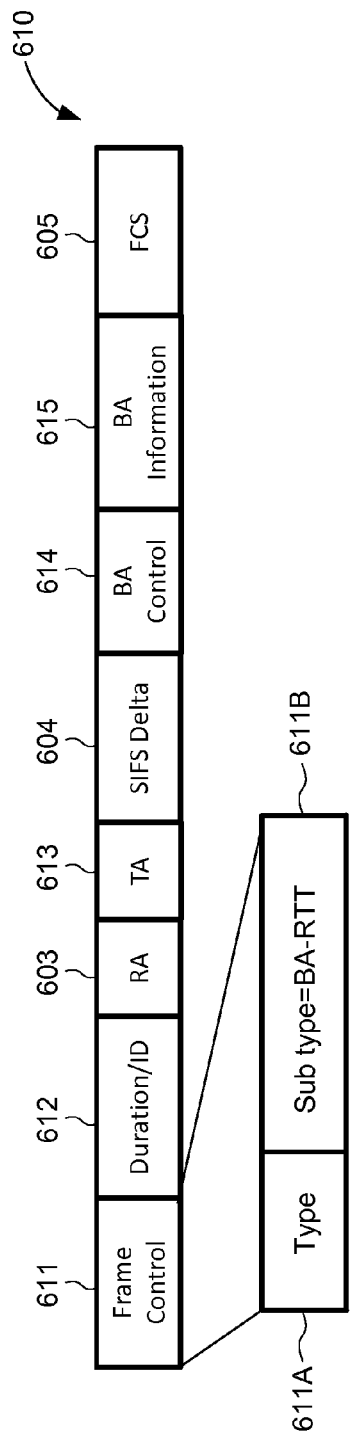
FIG. 6B depicts an example block acknowledgement frame in accordance with some embodiments.

For other embodiments, the response frame 420 may be a block acknowledgement (BA) frame that is modified to include the SIFS delta field 604. The modified BA frame may hereinafter be referred to as a "BA-RTT frame." For example, FIG. 6B shows an example BA-RTT frame 610 in accordance with the example embodiments. The BA-RTT frame 610 may be used as the response frame 420 in the example ranging operation 400 depicted in FIG. 4. The example BA-RTT frame 610 may include a 2-byte frame control field 611, a 2-byte duration/ID field 612, a 6-byte receiver address (RA) field 603, a 6-byte transmitter address (TA) field 613, a 3-byte SIFS delta field 604, a 2-byte BA control field 614, a variable-length BA information field 615, and a 4-byte FCS field 605. The frame control field 611 may include a 2-bit frame Type field 611A and a 4-bit Sub type field 611B. For other embodiments, the field lengths of the example BA-RTT frame 610 may be of other suitable values.

In accordance with the example embodiments, the Type field 611A and the Sub type field 611B may each be populated with currently unused or reserved bit patterns to indicate that the corresponding frame is a BA-RTT frame 610, as depicted in FIG. 6B. For example, while a bit pattern of "1001" for the Sub type field 611B indicates a BA frame (e.g., as defined by the IEEE 802.11 family of standards), a selected one of the unused or reserved bit patterns for the Sub type field 611B may be used to indicate the frame is a BA-RTT frame 610.

Referencing the actual SIFS duration of device D2 to "standard" SIFS durations, as described above with respect to FIGS. 6A-6B, may assume that the "standard" SIFS durations are known by other wireless devices and/or remain constant. For other embodiments, the actual SIFS duration of device D2 may be referenced to one or more previously determined SIFS durations of device D2 (e.g., rather than to the "standard" SIFS durations). For example, the actual SIFS duration may be referenced to a median value of previously determined SIFS durations of device D2, as described in more detail below with respect to FIGS. 7A-7B.

Figure 7A:
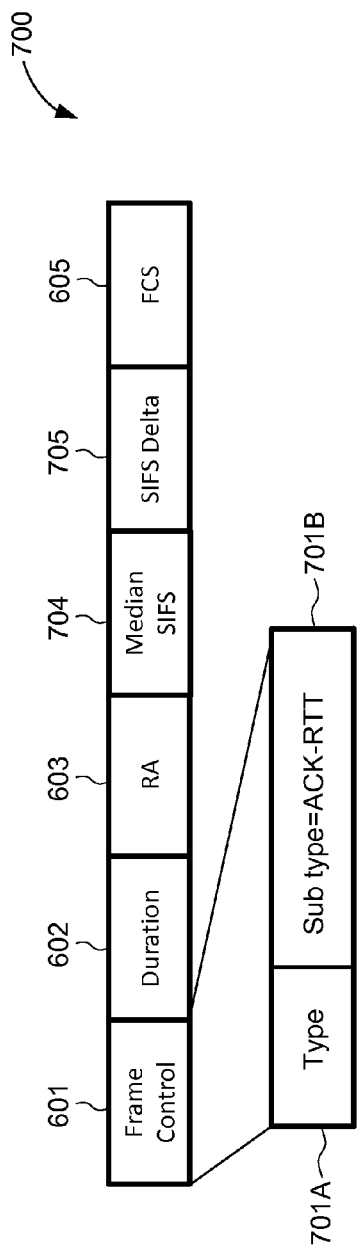
FIG. 7A depicts an example acknowledgement frame in accordance with other embodiments.

FIG. 7A shows another example ACK-RTT frame 700 in accordance with the example embodiments. The ACK-RTT frame 700 is similar to the ACK-RTT frame 600 of FIG. 6A, except that the 3-byte SIFS delta field 604 of ACK-RTT frame 600 is replaced by a 1-byte median SIFS field 704 and a 2-byte SIFS delta field 705 in the example ACK-RTT frame 700 of FIG. 7A. The Type field 701A and the Sub type field 701B of ACK-RTT frame 700, which may each be populated with currently unused or reserved bit patterns that indicate that the corresponding frame is a ACK-RTT frame, may be different than the bit patterns used for the Type field 601A and the Sub type field 601B of the example ACK-RTT frame 600 described above with respect to FIG. 6A.

The 8 bits of the median SIFS field 704 may store a median SIFS duration that indicates the median SIFS duration for a number of previous frame exchanges associated with device D2. For example, if a 100 ns unit is used for each bit, then the 8 bits of the median SIFS field 704 may represent median SIFS durations up to 25.5 us. The 2-byte SIFS delta field 705 may be used to indicate a time difference between the actual SIFS duration of the current frame exchange and the median SIFS duration (e.g., as stored in the median SIFS field 704). In this manner, the SIFS difference value may be expressed as $SIFS_{delta} = SIFS_{actual} - SIFS_{median}$. Applicant notes that if a 0.1 ns per-bit resolution is used for $SIFS_{delta}$, then the 16 bits of the SIFS delta field 705 may represent a difference value of +/−900 ns. For other embodiments, the field lengths of the example ACK-RTT frame 700 may be of other suitable values.

Figure 7B:
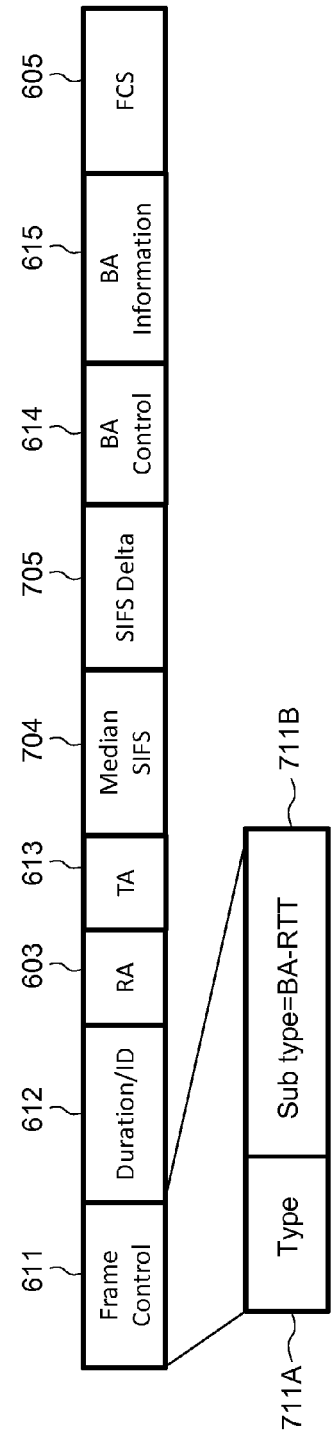
FIG. 7B depicts an example block acknowledgement frame in accordance with other embodiments.

The median SIFS information may also be provided in a block acknowledgement (BA) frame constructed in accordance with the example embodiments. For example, FIG. 7B shows another example BA-RTT frame 710 in accordance with the example embodiments. The BA-RTT frame 710 is similar to the BA-RTT frame 610 of FIG. 6B, except that the 3-byte SIFS delta field 604 of BA-RTT frame 610 is replaced by a 1-byte median SIFS field 704 and a 2-byte SIFS delta field 705 in the example BA-RTT frame 710 of FIG. 7B. The Type field 711A and the Sub type field 711B of BA-RTT frame 710, which may each be populated with currently unused or reserved bit patterns that indicate that the corresponding frame is a BA-RTT frame, may be different than the bit patterns used for the Type field 611A and the Sub type field 611B of the example BA-RTT frame 610 described above with respect to FIG. 6A. The 1-byte median SIFS field 704 and the 2-byte SIFS delta field 705 in the example BA-RTT frame 710 are similar to the 1-byte median SIFS field 704 and the 2-byte SIFS delta field 705 in the example ACK-RTT frame 700 of FIG. 7A. For other embodiments, the field lengths of the example BA-RTT frame 710 may be of other suitable values.

For some embodiments, a new information element (IE) may be defined to report SIFS information of device D2 (or any suitable responder device) to device D1 (or any suitable initiator device). For example, FIG. 8 shows an example SIFS IE 800 that, in accordance with the example embodiments, may be included in a control frame (or other suitable frame) to report SIFS information to another device. The SIFS IE 800 includes a 1-byte element ID field 810, a 1-byte length field 820, a 3-byte SIFS report field 830, and a non-extensible field 840. The element ID field 810 may store any currently unused or reserved IE ID value to indicate that the information element is a SIFS IE 800. The length field 820 indicates a length of the SIFS IE 800, which for the example of FIG. 8 is 5 bytes. The SIFS report field 830 may store either (1) a 3 byte value for $SIFS_{delta}$ or (2) a 1 byte value for $SIFS_{median}$ and a 2 byte value for $SIFS_{delta}$. For other embodiments, the various fields of the example SIFS IE 800 may be of other suitable values.

To maximize ranging accuracy, the ranging operations described herein may be performed using a single transmit chain (and a single antenna) in both the initiator device and the responder device, for example, to avoid errors resulting from cyclic shift diversity (CSD). For some embodiments, a selected bit in the data frame 410 (or any suitable frame that initiates the ranging operation) may be used to request the responder device to use a single transmit chain when sending the response frame 420 (or any suitable frame that includes SIFS information of the responder device) to the initiator device. The selected bit may be the reserved bit 4 in the L-SIG field of the data frame 410, any of the reserved bits 7-15 in the service field of the data frame 410, or any other suitable bit in the data frame 410.

As mentioned above, device D1 and device D2 may exchange capabilities during an association procedure, for example, to inform each other of their ability to support ranging operations in accordance with the example embodiments. More specifically, the exchanged capabilities between device D1 and device D2 may indicate whether each device supports the creation and/or reception of ACK-RTT frames 600, ACK-RTT frames 700, BA-RTT frames 610, and/or BA-RTT frames 710. When both device D1 and device D2 support using the ACK-RTT frames 600/700 and/or the BA-RTT frames 610/710 described above, then device D1 and device D2 may be configured to acknowledge receipt of data frames from each other using the ACK-RTT frames 600/700 and/or the BA-RTT frames 610/710 rather than using conventional ACK frames and conventional BA frames, respectively. In this manner, the responder device (e.g., device D2 in the above examples) may always embed its SIFS information in acknowledgement frames, which in turn allows the initiator device (e.g., device D1 in the above examples) to perform ranging operations on any frame exchange, for example, without specifically requesting a particular ranging operation.

For some embodiments, one of the reserved bits in the extended capabilities element of frames exchanged during association may be used to indicate support of the ACK-RTT and BA-RTT frames disclosed herein. For other embodiments, one of the reserved bits in the data frame 410 sent from the initiator device to the responder device (e.g., to initiate the ranging operation) may be used to indicate whether an ACK-RTT frame or a BA-RTT frame is expected in response to the data frame 410. For one example, reserved bit 4 in the L-SIG field of the data frame 410 may be used to request a response using an ACK-RTT frame or a BA-RTT frame. For another example, any of the reserved bits 7-15 in the service field of the data frame 410 may be used to request a response using an ACK-RTT frame or a BA-RTT frame.

For embodiments in which the data frame 410 is an FTM frame, one of the bits in the FTM frame may be used to indicate whether an ACK-RTT frame or a BA-RTT frame is expected in response to the FTM frame. For one example, reserved bit 4 in the L-SIG field of the FTM frame may be used to request a response using an ACK-RTT frame or a BA-RTT frame. For another example, any of the reserved bits 7-15 in the service field of the FTM frame may be used to request a response using an ACK-RTT frame or a BA-RTT frame. For yet another example, a newly added bit in the FTM frame may be used to request a response using an ACK-RTT frame or a BA-RTT frame.

The example embodiments are also applicable to devices compatible with high throughput/very high throughput (HT/VHT) protocols of the IEEE 802.11 standards. For such devices, one bit in the extended capabilities element of association frames, one of the reserved bits in the data frame 410, reserved bit 4 in the L-SIG field of the data frame 410, and/or any of the reserved bits 7-15 in the service field of the data frame 410 may be used to indicate support for ACK-RTT frames and BA-RTT frames when operating according to HT/VHT protocols. Alternatively, one of the bits in an FTM frame sent from the initiator device to the responder device (e.g., to initiate the ranging operation) may be used to indicate support for ACK-RTT frames and BA-RTT frames when operating according to HT/VHT protocols. For example, the reserved bit in the FTM frame may be bit 4 in the L-SIG field, may be any of the reserved bits 7-15 in the service field, and/or may be a newly added bit in the FTM frame.

The example embodiments are also applicable to ready-to-send/clear-to-send (RTS/CTS) frame exchanges, for example, where the responder device may report its SIFS information to the initiator device in the CTS frame. The example embodiments are also applicable to control frames and data frames. For example, when an AP sends a trigger frame to multiple STAs to request uplink multi-user (MU) frames, the STAs may report their SIFS information in the MU frames, for example, as a special element.

Figure 9:
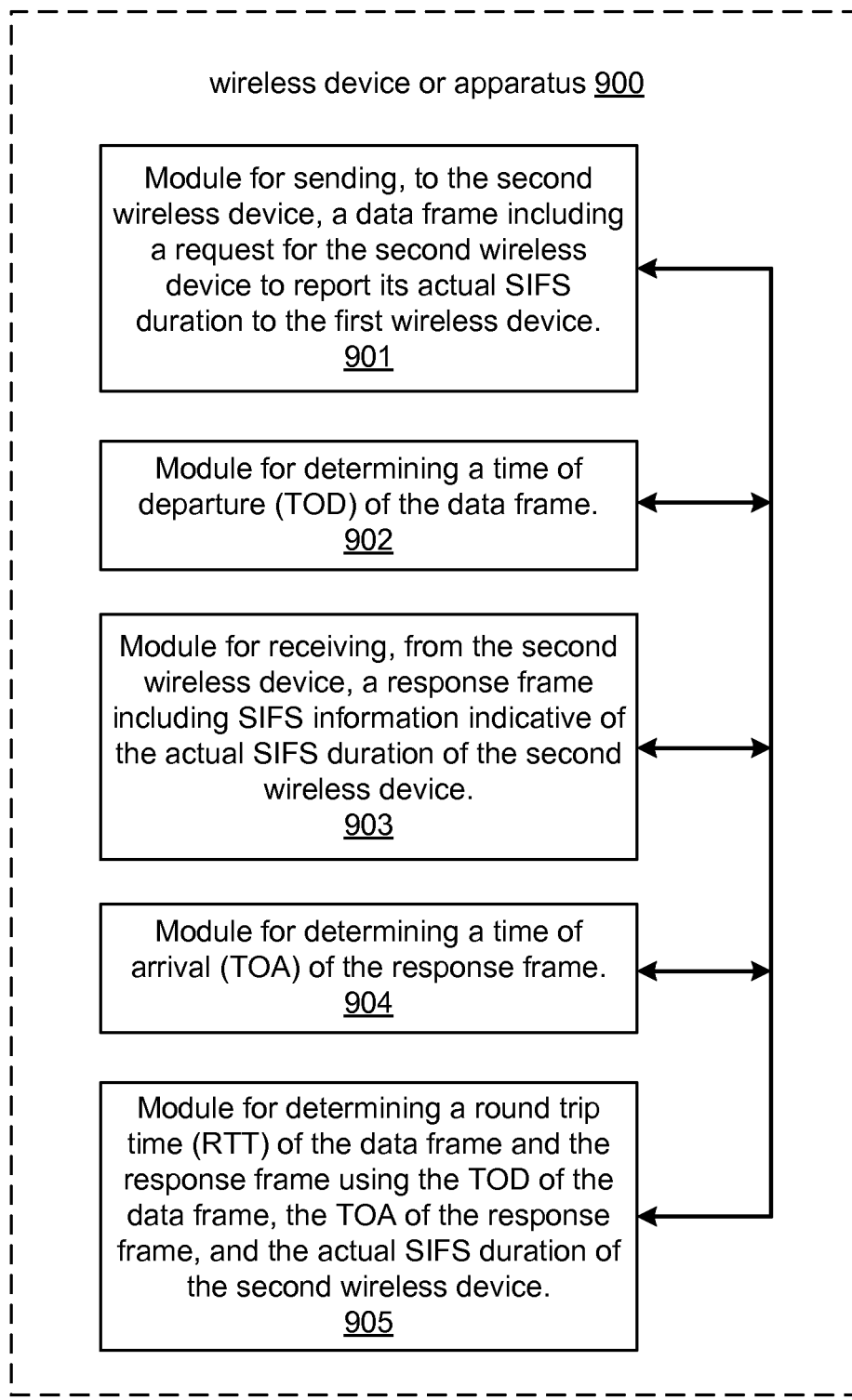
FIG. 9 is another block diagram of several sample aspects of an apparatus configured to perform ranging operations as taught herein.

FIG. 9 shows an example first wireless device or apparatus 900 represented as a series of interrelated functional modules. A module 901 for sending a data frame to a second wireless device may correspond at least in some aspects to, for example, a processor as discussed herein (e.g., processor 330) and/or to one or more transceivers discussed herein (e.g., transceivers 320). A module 902 for determining a time of departure (TOD) of the data frame 410 may correspond at least in some aspects to, for example, a processor as discussed herein (e.g., processor 330). A module 903 for receiving a response frame 420 from the second wireless device may correspond at least in some aspects to, for example, a processor as discussed herein (e.g., processor 330) and/or to one or more transceivers discussed herein (e.g., transceivers 320). A module 904 for determining a time of arrival (TOA) of the response frame 420 may correspond at least in some aspects to, for example, a processor as discussed herein (e.g., processor 330). A module 905 for determining a round trip time (RTT) of the data frame 410 and the response frame 420 may correspond at least in some aspects to, for example, a processor as discussed herein (e.g., processor 330).

The functionality of the modules of FIG. 9 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 9, as well as other components and functions described herein, may be implemented using any suitable means. Such means also may be implemented, at least in part, using corresponding structure as taught herein. For example, the components described above in conjunction with the "module for" components of FIG. 9 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor.

Accordingly, one aspect of the disclosure may include a non-transitory computer readable media embodying a method for time and frequency synchronization in non-geosynchronous satellite communication systems. The term "non-transitory" does not exclude any physical storage medium or memory and particularly does not exclude dynamic memory (e.g., conventional random access memory (RAM)) but rather excludes only the interpretation that the medium can be construed as a transitory propagating signal.

In the foregoing specification, the example embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense. For example, method steps depicted in the flow charts of FIG. 5 may be performed in other suitable orders and/or one or more method steps may be omitted.

What is claimed is:

1. A method of performing a ranging operation between a first wireless device and a second wireless device, the method performed by one or more processors of the first wireless device and comprising:
   sending, to the second wireless device, a data frame including a request for the second wireless device to report its actual Short Interframe Space (SIFS) duration to the first wireless device;
   determining a time of departure (TOD) of the data frame;
   receiving, from the second wireless device, a response frame including SIFS information indicative of the actual SIFS duration of the second wireless device;
   determining a time of arrival (TOA) of the response frame; and
   determining a round trip time (RTT) of the data frame and the response frame using the TOD of the data frame, the TOA of the response frame, and the actual SIFS duration of the second wireless device.

2. The method of claim 1, wherein the actual SIFS duration indicates a time duration between (1) a time that the second wireless device receives an end of a last symbol of the data frame from the first wireless device and (2) a time that the second wireless device transmits a beginning of a first symbol of the response frame to the first wireless device.

3. The method of claim 1, wherein the data frame comprises a fine timing measurement (FTM) frame.

4. The method of claim 1, wherein the data frame further comprises a request for the second wireless device to transmit the response frame using a high throughput/very high throughput (HT/VHT) protocol.

5. The method of claim 1, wherein the response frame comprises an acknowledgement (ACK) frame including a field to store the SIFS information.

6. The method of claim 1, wherein the SIFS information comprises a difference value indicative of a time difference between the actual SIFS duration and a standard SIFS duration.

7. The method of claim 6, wherein the standard SIFS duration is defined by the IEEE 802.11 standards.

8. The method of claim 6, wherein the response frame comprises an acknowledgement (ACK) frame including a first field to store the difference value and including a second field to store a median SIFS duration of the second wireless device.

9. The method of claim 1, wherein the response frame includes an information element (IE) including at least a field to store the SIFS information.

10. The method of claim 1, wherein:
    the first wireless device is to use a single transmit chain to send the data frame to the second wireless device; and
    the data frame further comprises a request for the second wireless device to use a single transmit chain to transmit the response frame to the first wireless device.

11. A first wireless device configured to perform a ranging operation with a second wireless device, the first wireless device comprising:
    one or more transceivers to exchange signals with at least the second wireless device;
    one or more processors; and
    a memory storing instructions that, when executed by the one or more processors, cause the first wireless device to:
       send, to the second wireless device, a data frame including a request for the second wireless device to report its actual Short Interframe Space (SIFS) duration to the first wireless device;
       determine a time of departure (TOD) of the data frame;
       receive, from the second wireless device, a response frame including SIFS information indicative of the actual SIFS duration of the second wireless device;
       determine a time of arrival (TOA) of the response frame; and
       determine a round trip time (RTT) of the data frame and the response frame using the TOD of the data frame, the TOA of the response frame, and the actual SIFS duration of the second wireless device.

12. The first wireless device of claim 11, wherein the data frame comprises a fine timing measurement (FTM) frame.

13. The first wireless device of claim 11, wherein the data frame further comprises a request for the second wireless device to transmit the response frame using a high throughput/very high throughput (HT/VHT) protocol.

14. The first wireless device of claim 11, wherein the response frame comprises an acknowledgement (ACK) frame including a field to store the SIFS information.

15. The first wireless device of claim 11, wherein the SIFS information comprises a difference value indicative of a time difference between the actual SIFS duration and a standard SIFS duration.

16. The first wireless device of claim 15, wherein the standard SIFS duration is defined by the IEEE 802.11 standards.

17. The first wireless device of claim 15, wherein the response frame comprises an acknowledgement (ACK)

frame including a first field to store the difference value and including a second field to store a median SIFS duration of the second wireless device.

18. The first wireless device of claim 11, wherein the response frame includes an information element (IE) including at least a field to store the SIFS information.

19. The first wireless device of claim 11, wherein:
the first wireless device is to use a single transmit chain to send the data frame to the second wireless device; and
the data frame further comprises a request for the second wireless device to use a single transmit chain to transmit the response frame to the first wireless device.

20. A first wireless device configured to perform a ranging operation with a second wireless device, the first wireless device comprising:
means for sending, to the second wireless device, a data frame including a request for the second wireless device to report its actual Short Interframe Space (SIFS) duration to the first wireless device;
means for determining a time of departure (TOD) of the data frame;
means for receiving, from the second wireless device, a response frame including SIFS information indicative of the actual SIFS duration of the second wireless device;
means for determining a time of arrival (TOA) of the response frame; and
means for determining a round trip time (RTT) of the data frame and the response frame using the TOD of the data frame, the TOA of the response frame, and the actual SIFS duration of the second wireless device.

21. The first wireless device of claim 20, wherein the data frame comprises a fine timing measurement (FTM) frame.

22. The first wireless device of claim 20, wherein the response frame comprises an acknowledgement (ACK) frame including a field to store the SIFS information.

23. The first wireless device of claim 20, wherein the SIFS information comprises a difference value indicative of a time difference between the actual SIFS duration and a standard SIFS duration.

24. The first wireless device of claim 23, wherein the response frame comprises an acknowledgement (ACK) frame including a first field to store the difference value and including a second field to store a median SIFS duration of the second wireless device.

25. The first wireless device of claim 20, wherein the response frame includes an information element (IE) including at least a field to store the SIFS information.

26. A non-transitory computer-readable storage medium storing one or more programs containing instructions that, when executed by one or more processors of a first wireless device, cause the first wireless device to perform operations comprising:
sending, to a second wireless device, a data frame including a request for the second wireless device to report its actual Short Interframe Space (SIFS) duration to the first wireless device;
determining a time of departure (TOD) of the data frame;
receiving, from the second wireless device, a response frame including SIFS information indicative of the actual SIFS duration of the second wireless device;
determining a time of arrival (TOA) of the response frame; and
determining a round trip time (RTT) of the data frame and the response frame using the TOD of the data frame, the TOA of the response frame, and the actual SIFS duration of the second wireless device.

27. The non-transitory computer-readable storage medium of claim 26, wherein the data frame comprises a fine timing measurement (FTM) frame.

28. The non-transitory computer-readable storage medium of claim 26, wherein the response frame comprises an acknowledgement (ACK) frame including a field to store the SIFS information.

29. The non-transitory computer-readable storage medium of claim 26, wherein the SIFS information comprises a difference value indicative of a time difference between the actual SIFS duration and a standard SIFS duration.

30. The non-transitory computer-readable storage medium of claim 29, wherein the response frame comprises an acknowledgement (ACK) frame including a first field to store the difference value and including a second field to store a median SIFS duration of the second wireless device.

* * * * *